Patented July 5, 1949

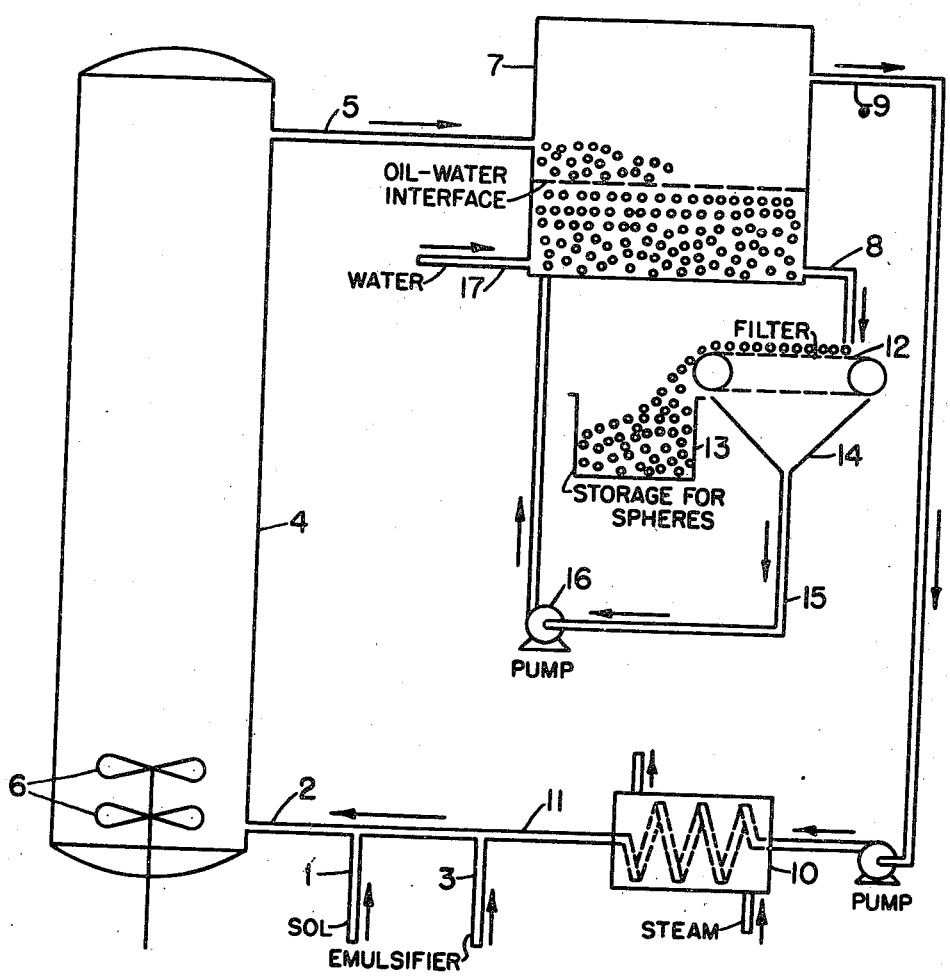

2,474,911

UNITED STATES PATENT OFFICE 2,474,911

PREPARATION OF SPHERICAL GEL PARTICLES

Jerry A. Pierce and Charles N. Kimberlin, Jr., Baton Rouge, La., assignors to Standard Oil Development Company, a corporation of Delaware Application March 11, 1944, Serial No. 526,049

9 Claims. (Cl. 252—448)

The present invention relates to the preparation of finely divided gel particles and more particularly relates to the preparation of microspherical gel particles.

Inorganic gels are well known and have been long used for various purposes, for example for the adsorption of condensible vapors from gaseous carriers and for catalytic purposes as a catalyst itself or as a component thereof or as a carrier. The most widely used of these inorganic gels in the dried condition is that of silica with or without the use of other gelatinous materials such as alumina. However, other gels are known such as alumina, titania, zirconia, and the like.

These gels have been found to be particularly useful as catalysts for carrying out reactions involving hydrocarbons, for example, cracking, dehydrogenation, hydrogenation and the like. These catalysts are particularly adapted for use in the so-called fluid catalyst process in which the catalyst is in a powdered form and is aerated or fluidized by means of a gas so that it acquires the properties of a liquid such as fluid flow, hydrostatic pressure and the like. These powdered catalysts are generally prepared by grinding silica gel or other types of gel catalysts to the desired size. Recently it has been found that catalysts having a particle size within the desired range for the fluid catalyst process, that is between 20 and 120 microns, can be prepared by causing a sol of the desired gel-forming substance to set while dispersed in a water-immiscible liquid such as oil whereby spherical particles having diameters up to 1 mm. are obtained, the actual diameters depending upon the degree of dispersion.

Such a process is difficult for continuous operation without the use of a plurality of agitators with the dispersion overflowing from one agitator to the other. When preparing larger particles it is an easy matter to perform a continuous operation by causing droplets of a sol to descend a static column of a water-immiscible or partially miscible liquid such as oil or n-butanol. Such a process is not suitable to the preparation of the microspheres, however, since their rate of settling is too slow. This invention, therefore, has for its main object the preparation of microspherical gel particles in a continuous and efficient manner. This and other objects of the invention will be apparent from the following description and drawing.

Referring to the drawing, a sol is introduced through line 1 and emulsified with water-immiscible liquid such as oil or a partially water-miscible liquid such as normal butanol, flowing in line 2. For the purposes of this description, the liquid used will be considered oil but it will be understood that it may be any organic liquid capable of forming a separate layer in contact with water and of lower density than the hydrosol. The oil contains an emulsifier such as diglycol oleate which is introduced through line 3. The oil containing the dispersed sol thus produced is introduced into the bottom of column 4 and passed slowly up the column during which time the sol sets to a hydrogel and is withdrawn through line 5 along with the oil. The flow of the oil up the column is maintained at a rate which exceeds the rate of settling of the sol droplets in the oil, thus effectively keeping the droplets separated and continually moving upwardly. The lower portion of the column 4 is maintained as a zone of agitation by means of agitators 6. Turbulence in the upper part of the column should be avoided.

The size of particles leaving column 4 through line 5 can be controlled by the degree of dispersion of the sol in the oil which is a function of the amount of centrifuging agent, the speed of the agitation, the viscosity of the oil etc., but in spite of all of these factors, there will always be some variation in particle size. However, by properly adjusting the rate of flow of the oil up the column, a maximum limitation on the particle size can be maintained. If the rate of flow of the oil up the column just exceeds the settling rate of the largest particle desired, all fluid particles having a size larger than that desired will settle back into the mixing zone of the column and then be broken up by the agitators 6. Thus only those particles below a desired maximum size will be removed from the column through line 5.

The slurry of hydrogel particles removed from the column through line 5 is introduced into a separator 7 where the oil floats on a stream of water introduced through line 17. The microspheres of hydrogel descend through the oil-water interface and are removed as a slurry in water through line 8. Oil is removed from the separator through line 9 and is adjusted to any desired temperature in heat exchanger 10 and recycled to the column through line 11.

The spheres removed from the separator are passed to an endless belt filter 12 where they are separated from the water and passed to storage container 13, from which they may be subjected to further treatments such as washing, impregnating and drying, etc. The water from the filter is collected in funnel 14 and recycled by line 15 and pump 16.

If a partially water-miscible liquid such as normal butanol is used as the dispersing medium in column 4, the separator 7 may be cooled if desired so as to cause phase separation between the butanol and the water. The water circulated through line 15 will contain a small amount of butanol so that there will be no tendency for the butanol to dissolve in the water. As a result the hydrogel particles will descend through the alcohol-water interface and be withdrawn as an aqueous slurry.

Suitable water-immiscible liquids for dispersing the sol in line 2 and flowing it up column 4 are hydrocarbon fractions, such as kerosene, naphtha, lubricating oil, benzene, etc.; or other organic liquids such as ethylene dichloride, normal butanol, etc.

Suitable surface active agents for emulsifying the sol in the oil includes any well known emulsifier, such as diglycol oleate or any other similar partial ester, organic sulfates and sulfonates, sulfonic acids, naphthenic acids, and various commercial emulsifying agents.

The process of course is open to many variations, particularly with respect to starting materials and conditions. The process may be used for the preparation of simple gels, such as silica or alumina which may later be impregnated with catalytic or promotional amounts of other substances. On the other hand, mixed gels may also be prepared. Furthermore the sols may be prepared directly in the dispersing medium itself. For example instead of introducing a ready made sol into the oil in line 2, the separate components of the sol-forming substance, separately emulsified or not with oil may be separately introduced into line 2 and the sol prepared in line 2. This is particularly advantageous in making hydrogel spheres of sols which set too quickly to be advantageously prepared outside of the column. Plural gels may likewise be prepared by mixing the individual sols in line 2.

The nature and objects of the present invention having thus been set forth and an illustrative embodiment of the same given, what is claimed as new and useful and desired to be secured by Letters Patent is:

1. A process for preparing inorganic hydrogel spheres which comprises emulsifying an inorganic hydrosol in an organic liquid capable of forming a separate layer in contact with water and of lower density than said hydrosol in an agitation zone, moving the resultant emulsion upwardly in a column, providing a travel time of said emulsion in said column sufficient to enable the emulsified sol droplets to set to hydrogel spheres, maintaining the rate of flow of the emulsion greater than the rate of settling of emulsified sol droplets of the maximum size desired but less than the rate of settling of larger droplets of sol, permitting the said larger droplets to settle into the agitation zone to be broken up and removing hydrogel spheres from the upper portion of said column.

2. The process as defined in claim 1 wherein the organic liquid is a mineral oil.

3. The process as defined in claim 1 wherein the organic liquid is normal butanol.

4. The continuous process for preparing inorganic hydrogel spheres of a predetermined maximum size which comprises continuously emulsifying an inorganic sol in an organic liquid capable of forming a separate layer in contact with water and of lower density than said sol, continuously moving said emulsion upwardly in a column, maintaining the rate of flow of the emulsion at a rate exceeding the rate of settling of emulsified sol droplets of up to the maximum size desired but less than the rate of settling of larger droplets whereby the latter settle, breaking up said larger droplets, providing a travel time of said emulsion in said column sufficient to enable the emulsified sol droplets to set to hydrogel spheres, continuously floating said organic liquid containing hydrogel spheres on a moving body of water whereby said hydrogel spheres settle into said water and continuously separating hydrogel spheres from said water.

5. The process according to claim 4 wherein the organic liquid is a mineral oil.

6. The process according to claim 4 wherein the organic liquid is normal butanol.

7. The process for preparing inorganic hydrogel spheres which comprises establishing an upwardly moving column of an organic liquid capable of forming a separate layer in contact with water, establishing an agitation zone in the lower portion of said column, emulsifying an inorganic sol of greater density than said organic liquid in said organic liquid whereby said emulsified sol moves upwardly in said column of organic liquid; maintaining the flow of liquid upwardly in said column at a rate which exceeds the rate of settling of dispersed sol droplets of a given size but permits droplets of a larger size to settle into said agitation zone whereby said droplets are broken up into smaller droplets, providing a travel time for said emulsified sol droplets in said column sufficient to enable them to set to hydrogel spheres and removing hydrogel spheres from the upper portion of said column.

8. A method according to claim 7 wherein the organic liquid is a mineral oil.

9. A method according to claim 7 wherein the organic liquid is normal butanol.

JERRY A. PIERCE.
CHARLES N. KIMBERLIN, Jr.

REFERENCES CITED

The following references are of record in the file of this patent:

UNITED STATES PATENTS

| Number | Name | Date |
|---|---|---|
| 1,195,099 | Salm | Aug. 15, 1916 |
| 1,614,636 | Wachtel | Jan. 18, 1927 |
| 2,102,849 | Kokatnur | Dec. 21, 1937 |
| 2,284,248 | Baker et al. | May 26, 1942 |
| 2,385,217 | Marisic | Sept. 18, 1945 |
| 2,370,200 | Shabaker | Feb. 27, 1945 |

FOREIGN PATENTS

| Number | Country | Date |
|---|---|---|
| 15,365 | Great Britain | July 6, 1916 |

OTHER REFERENCES

Handbook of Chemistry & Physics, Hodgman & Lange, 1931, page 336.